(12) United States Patent
Segovia et al.

(10) Patent No.: US 7,969,037 B2
(45) Date of Patent: Jun. 28, 2011

(54) CONFIGURATION OF A WIND TURBINE NACELLE

(75) Inventors: Eugenio Yegro Segovia, Madrid (ES); Pedro Luis Benito Santiago, Rheine (DE)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/901,073

(22) Filed: Oct. 8, 2010

(65) Prior Publication Data

US 2011/0101699 A1     May 5, 2011

(51) Int. Cl.
*H20B 6/00* (2006.01)
(52) U.S. Cl. ........................... 290/55; 290/43
(58) Field of Classification Search .............. 290/55, 290/44
See application file for complete search history.

(56) References Cited

U.S. PATENT DOCUMENTS

| | | | |
|---|---|---|---|
| 7,126,236 B2 * | 10/2006 | Harbourt et al. | 290/44 |
| 7,360,310 B2 * | 4/2008 | Bagepalli et al. | 29/898.08 |
| 7,394,166 B2 * | 7/2008 | Teichmann et al. | 290/44 |
| 7,538,446 B2 * | 5/2009 | Bonnet | 290/55 |
| 7,750,490 B2 * | 7/2010 | Scholte-Wassink | 290/44 |
| 7,843,080 B2 * | 11/2010 | Jansen | 290/55 |
| 7,851,937 B2 * | 12/2010 | Poon | 290/55 |

FOREIGN PATENT DOCUMENTS

| | | |
|---|---|---|
| EP | 0821161 A1 | 1/1998 |
| EP | 1101934 A2 | 5/2001 |
| EP | 1101936 A2 | 5/2001 |
| EP | 1291521 A1 | 3/2003 |
| WO | 2004109157 A1 | 12/2004 |

* cited by examiner

*Primary Examiner* — T C Patel
*Assistant Examiner* — Iraj A Mohandesi
(74) *Attorney, Agent, or Firm* — Global Patent Operation; Douglas D. Zhang

(57) ABSTRACT

A wind turbine nacelle configuration includes a frame structure configured for mounting atop a wind turbine tower. The frame structure includes a base, side support members, and top support members. A shell is attached to the frame structure to enclose the nacelle. A drive train may be housed within the frame structure and includes a low speed rotor shaft connected to a gearbox, and a high speed shaft connecting the gearbox to a generator. The frame structure is configured so that at least one component of the drive train is suspended from the top support members within the frame structure.

20 Claims, 3 Drawing Sheets

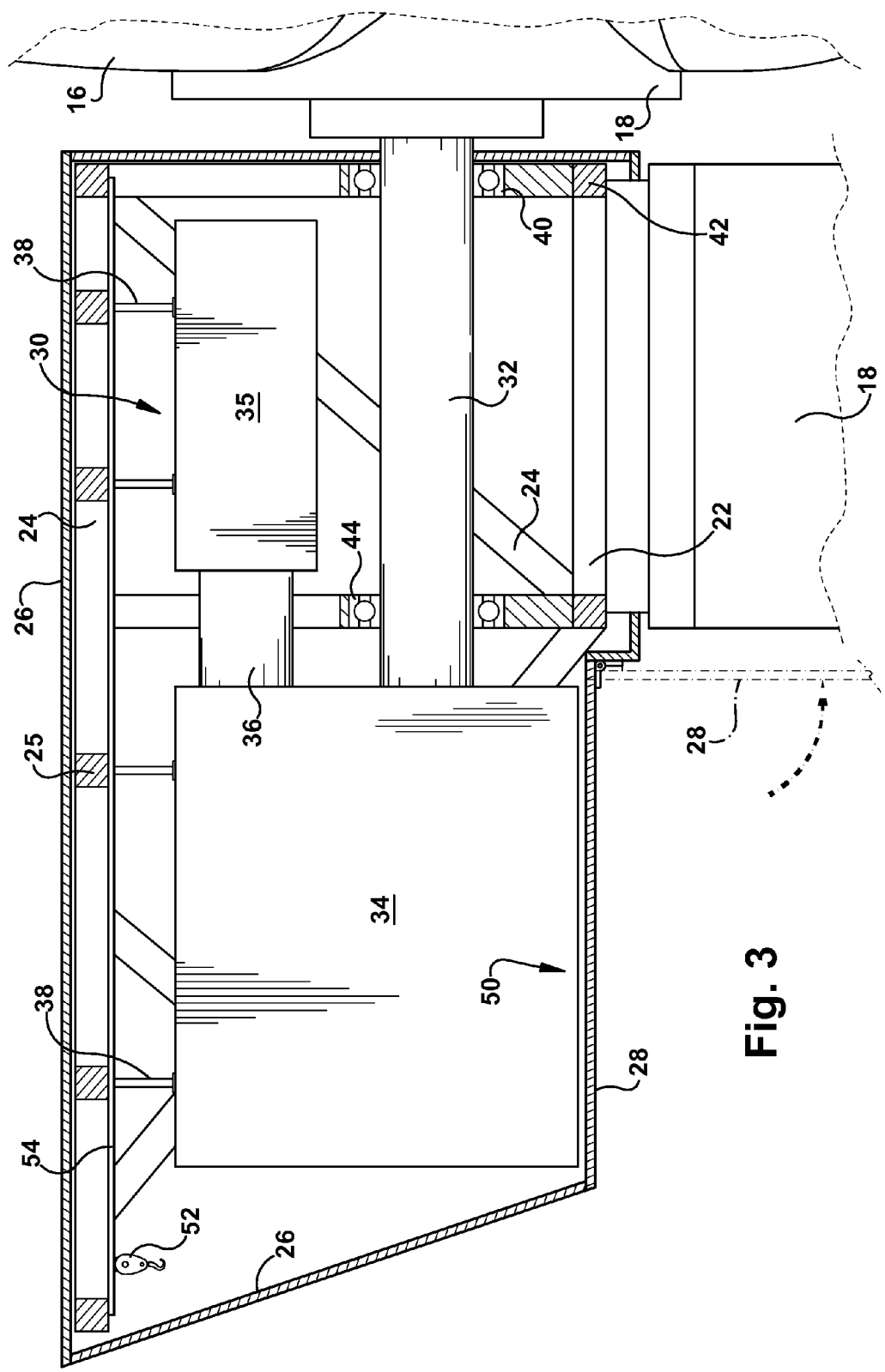

CONFIGURATION OF A WIND TURBINE NACELLE

BACKGROUND OF THE INVENTION

The present invention relates generally to the field of wind turbines, and more particularly to a configuration of wind turbine nacelle.

Wind power is considered one of the cleanest and most environmentally friendly energy sources presently available, and wind turbines have gained increased attention in this regard. A modern wind turbine typically includes a tower, generator, gearbox, nacelle, and one more rotor blades. The rotor blades capture kinetic energy from wind using known foil principles, and transmit the kinetic energy through rotational energy to turn a shaft that is coupled to the gearbox, or if a gearbox is not used, directly to the generator. The generator then converts the mechanical energy to electrical energy that may be supplied to a utility grid.

Modern wind turbines can be quite large, with many designs having a rotor hub height exceeding 100 meters. Maintenance of these wind turbines often requires the use of a large construction crane in order to repair or replace components in the nacelle, particularly the gearbox and/or generator. In addition, it is often the situation that, due to location of the gearbox or generator in the nacelle frame, the entire nacelle must be removed from the tower in order to replace or repair these components. This procedure also requires a crane. The tremendous expense and logistics associated with these maintenance/repair procedures that require a crane have a significant detrimental impact on the economic benefits of wind generated power.

Accordingly, the industry would benefit from an advance in wind turbine design that would reduce the requirements for an on-site crane in the performance of maintenance or repair work on wind turbines.

BRIEF DESCRIPTION OF THE INVENTION

Various aspects and advantages of the invention will be set forth in part in the following description, or may be obvious from the description, or may be learned through practice of the invention.

In accordance with aspects of the invention, a wind turbine nacelle configuration includes a frame structure configured for mounting atop a wind turbine tower and housing a drive train assembly. The frame structure includes a base, side support members, and top support members. A shell may be attached to the frame structure to enclose the nacelle configuration and, in a particular embodiment, may include a plurality of individual shell panels attached to the frame structure. The frame structure is configured such that, with a drive train housed within the frame structure, and at least a portion of the drive train is suspended from the top support members within the frame structure. The drive train may include a low speed rotor shaft connected between a rotor hub and a gearbox, and a high speed shaft connected between the gearbox and a generator, with at least one of the gearbox or generator suspended from the top support members. This particular configuration of a nacelle, and placement of the generator and gearbox within the nacelle, provide distinct advantages, as described in greater detail herein.

Various embodiments of the invention also encompass a wind turbine that incorporates any one of the various unique nacelle configurations set forth herein.

Various features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

Various aspects and embodiments of the present invention will now be described in connection with the accompanying drawings, in which.

DETAILED DESCRIPTION OF THE EXEMPLARY EMBODIMENTS OF THE DISCLOSURE

Figure 1:
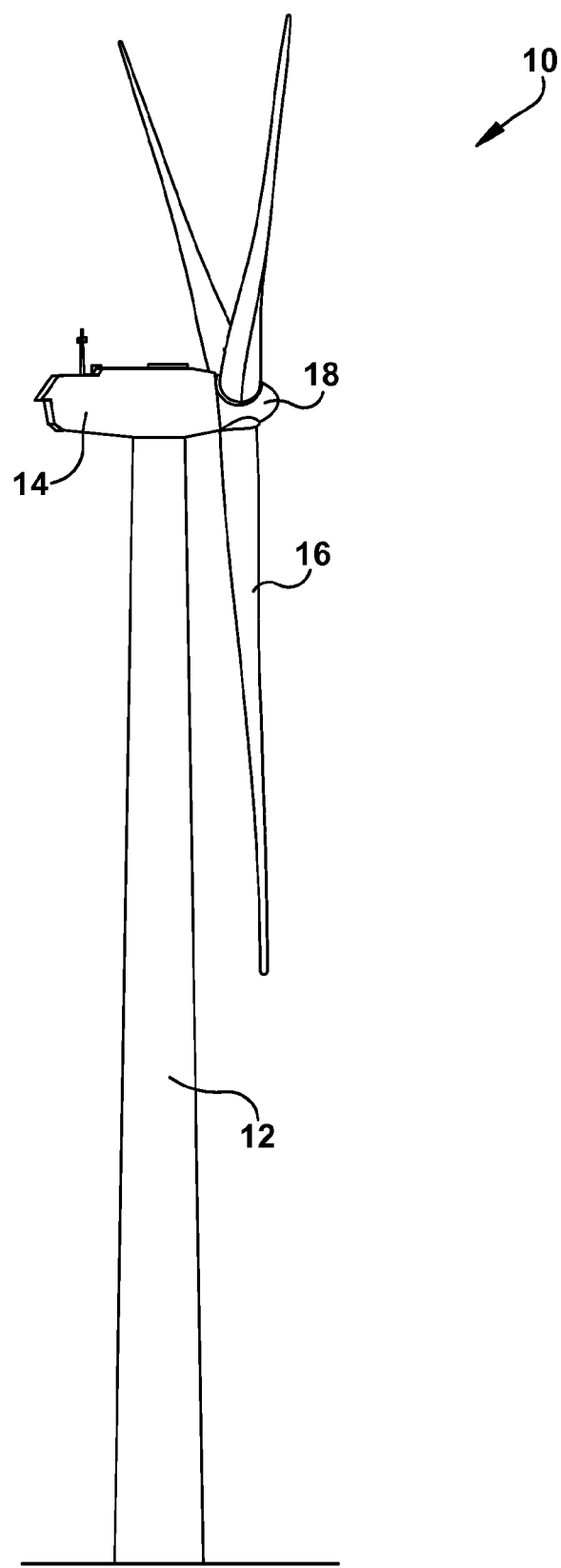
FIG. 1 is a perspective view of a conventional wind turbine, and particularly illustrates a nacelle mounted atop of a tower.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention include such modifications and variations as come within the scope of the appended claims and their equivalents.

FIG. 1 illustrates a wind turbine 10 of conventional construction. The wind turbine 10 includes a tower 12 with a nacelle 14 mounted thereon. A plurality of turbine blades 16 are mounted to a rotor hub 18. The blades 16 convert motive force of wind into rotational mechanical energy to generate electricity with a generator housed in the nacelle 14. The individual wind turbine 10 may include a controller housed in the nacelle 14, and may be in communication with a central ground based controller via transmission lines that run through the tower 12. The ground based controller is typically configured with a number of turbines within, for example, a wind farm.

Figure 2:
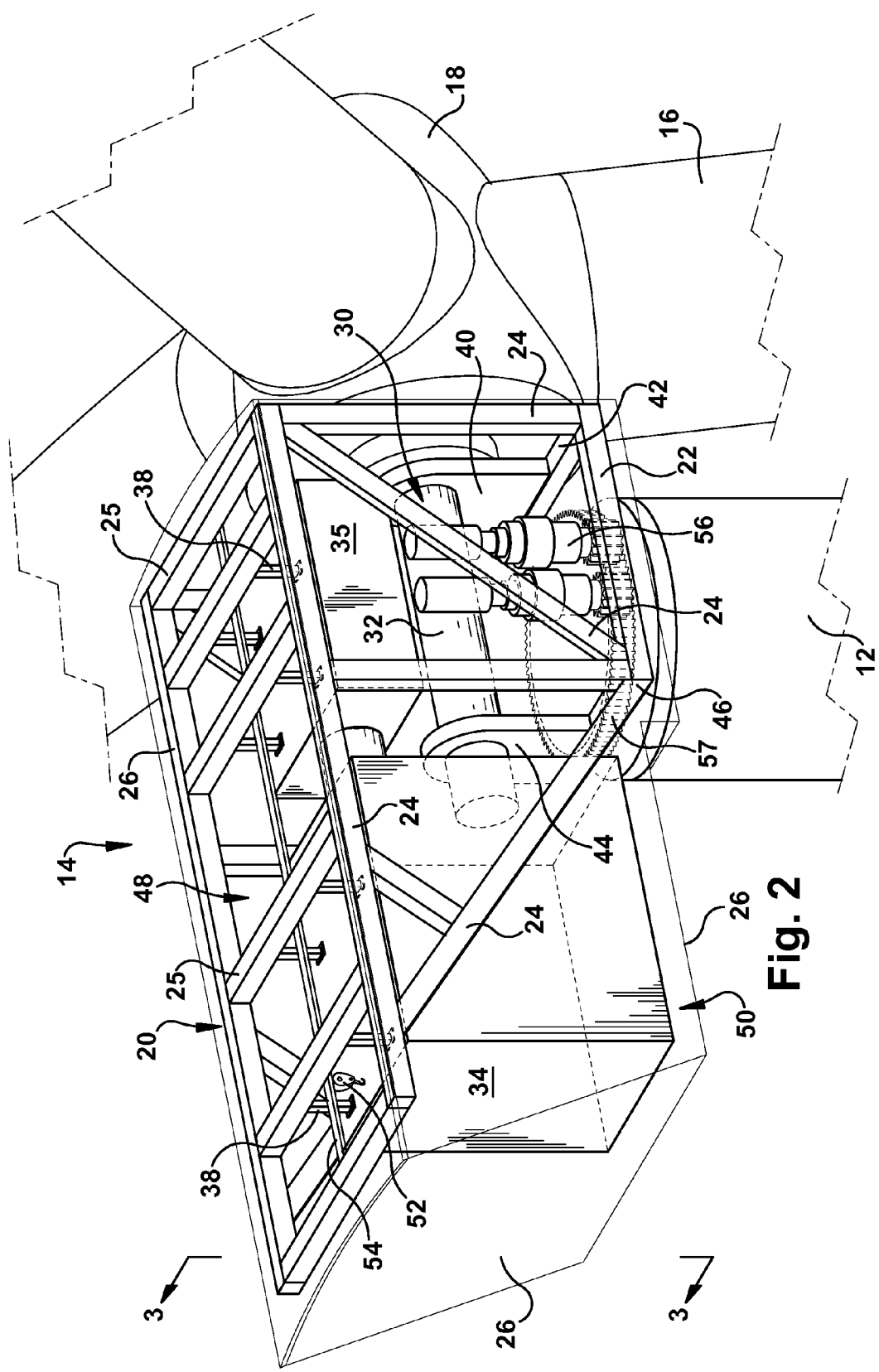
FIG. 2 is a perspective view of an embodiment of a nacelle in accordance with aspects of the invention; and, FIG. 3 is a side cut-away view of the embodiment of FIG. 2 taken along the lines indicated in FIG. 2.

FIGS. 2 and 3 present a more detailed view of an embodiment of a nacelle configuration incorporating aspects of the invention. The term "nacelle configuration" is used herein to encompass the nacelle housing or structure and the internal component arrangement, such as a drive train. In the illustrated embodiment, the nacelle 14 includes a frame structure 20 having a base 22 that is configured for mounting atop the tower 12. The base 22 may be any assembly of structural elements that serve to support various components within the nacelle, as well as operationally configure the nacelle on the tower 12. Any number and configuration of internal functional components may be supported by the base 22. For example, yaw drives 56 are supported by the base 22 and are in engagement with a gear 57 mounted at the top of the tower 12 for yaw control of the rotor hub 18. Additional components supported by the base 22 may include a pitch drive, oil cooler, hydraulic rotor brake, control panel, and so forth. It should be readily appreciated that the frame structure 20 may have any shape or size to accommodate any configuration of control or functional elements within the base section of the nacelle 14.

The frame structure 20 includes side support members 24 and top support members 25. In the illustrated embodiment, the side support members 24 and top support members 25 define a skeleton box-like frame structure. The support members 24, 25 may be any configuration of beams, rails, or other structural members that provide the nacelle 14 with a desired degree of structural rigidity and support the internal components of the nacelle 14. It should be readily appreciated that the arrangement of side support members 24 and top support members 25, as well as the configuration of the base 22, may vary widely within the scope of the invention, and that the embodiment illustrated in FIG. 2 is for illustrative purposes only. Also, it should be understood that structural support members may serve as both side support members 24 and top support members 25 depending on the particular configuration of the frame structure 20.

A shell is attached to the frame structure to enclose the nacelle 14. In a particular embodiment, the shell if formed from a plurality of pre-formed shell panels 26 attached to various members of the frame structure 20 to enclose the nacelle 14. These panels 26 may be modular in construction so that replacement or repair of any one or number of the panels 26 is readily achieved. The panels 26 may be made of any conventional construction material suitable for an exterior shell or skin of a nacelle 14, and may be bolted or attached to the frame structure 20 by any conventional means.

A drive train 30 is housed within the frame structure 20, and includes a low speed rotor shaft 32 that connects the rotor hub 18 to a gearbox 34. A high speed shaft 36 is connected between the gearbox 34 and a generator 35. At least one of the components of the drive train is suspended from the top support members. For example, either or both (as in the illustrated embodiment) of the gearbox 34 and generator 35 may be suspended from top support members 25 within the frame structure 20 by suspension support members 38. Thus, as can be readily appreciated from FIGS. 2 and 3, the weight of the gearbox 34 and the generator 35 (or any other combination of drive train components) is supported by the top of the frame structure 20. The components are not mounted to the base 22 or any type of aft extension of the base 22. The suspension support members 38 may be any manner of rail, beam, chain, or the like. The gearbox 34 and generator 35 are mechanically attached to the suspension support members 38 so as to be readily disconnected from the top support members 25 for replacement or repair.

In the particular configuration of the nacelle configuration 14 illustrated in the figures, the generator 35 is disposed forward of the gearbox 34 within the frame structure 20. The "forward" direction refers to the end of the nacelle 14 closest to the rotor hub 18. The generator 35 may also be disposed above the low speed rotor shaft 32, with "above" referring to a position above a horizontal plane through the low speed rotor shaft. Because the generator 35 is not mounted to the base 22, advantage can be taken of the space within the nacelle 14 above the low speed rotor shaft 32 and forward of the gearbox 34 by suspending the generator 35 from the top of the frame structure 25 into this space.

The frame structure 20 may incorporate various bearing configurations for support of the low speed rotor shaft 32 between the rotor hub 18 and gearbox 34. In the illustrated embodiment, at least one bearing is supported by the frame structure 20. Upon disconnecting the low speed rotor shaft 32 from the gearbox 34, the shaft 32 may be additionally supported by a sling or other support temporarily suspended from the top of the frame structure. In the illustrated embodiment, dual bearings are configured with the frame structure 20 and, thus, additional support of the shaft 32 from above would not be needed. In particular, bearing 40 is supported by a first bearing support member 42, and a second bearing 44 is supported by a second bearing support member 46 rearward of the first bearing 40. The first bearing support member 42 and second bearing support member 46 may comprise members of the base 22, or may be in addition to the base 22. In the illustrated embodiment, the bearing support members 42, 46 are cross beam members that extend between the opposite side support members 24 and may be considered as defining the forward and aft limits of the base 22.

The nacelle 14 includes a rear section 48 within the frame structure 20. The rear section 48 is aft (direction away from the rotor hub 18) of the base 22 and has an open bottom 50. The top support members 25 and side support members 24 extend at least partially into the rear section 48, as particularly illustrated in FIG. 2. The bottom 50 of the rear section 48 is "open" in the sense that support members do not extend between the side support members 24 below the gearbox 34. The open bottom 50 has dimensions such that the gearbox 34 may be disconnected from its respective top support members 25 and lowered out of (or raised into) the nacelle 14 through the open bottom 50. In this regard, shell member 28 that extends across the open bottom 50 is preferably hinged or otherwise movable from a first position wherein it encloses the open bottom 50 to an open position wherein the open bottom 50 is exposed or accessible, as particularly illustrated in phantom in FIG. 3.

A distinct advantage of the unique construction according to certain embodiments of the present invention is that components within the nacelle 14 may be removed or introduced through the open bottom 50 of the frame structure 20. This distinction has particular significance when repair or replacement of the gearbox 34 or generator 35 is required. With the present configuration, it is not necessary to remove the nacelle 14 from the tower 12 with a crane (e.g. a 100 meter crane) or similar external device in order to replace the gearbox 34. The gearbox 34 can be raised or lowered with any configuration of suitable lifting mechanism that is supported by the frame structure 20. In the illustrated embodiment, a winch and pulley system 52 is illustrated for this purpose. The winch 52 is slidable along a rail 54 generally along the length of the frame structure 20 for positioning any manner of component within the frame structure. The winch 52 may be used to lift or remove any manner of tooling or parts for maintenance or repair of the various components within the nacelle 14. For the larger, heavier, components, such as the gearbox 34, yaw drives 56, generator 35, and the like, the frame structure 20 may be used as support for extra pulleys, winches, or any other manner of lifting mechanism for removing these components from the nacelle 14 without the requirement of a crane or removing the nacelle 14 from the tower 12.

The nacelle configuration 14 described herein may provide several notable advantages. For example, as mentioned, it is possible to replace the gearbox 34 by disconnecting the gearbox 34 from the low speed rotor shaft 32 and high speed rotor shaft 36, and lowering the gearbox 34 through the open bottom 50 of the frame structure 20. Another advantage is that the overall drive train length is reduced because the generator 35 is disposed within the frame structure forward of the gearbox 34. The generator 35 may also be located in available space above the low speed rotor shaft 32. This configuration allows for a significant reduction in the length of the rear section 48 of the frame structure 20, and overall length of the nacelle 14. The length of piping associated with a gearbox oil cooler may also accordingly be reduced.

It should also be readily appreciated that aspects of the present invention encompass a complete wind turbine 10 (FIG. 1) that incorporates a nacelle configuration in accordance with aspects of the invention described herein.

Various embodiments of the invention also encompass a nacelle structure without the drive train components, or other internal power generation or control components. For example, an embodiment of the invention includes the nacelle 14 incorporating the frame structure 20, shell 26, suspension support members 38, open bottom 50, and the like, that define a "housing" or "shell" structure having the unique advantages of the present invention as set forth herein.

While the present subject matter has been described in detail with respect to specific exemplary embodiments and methods thereof, it will be appreciated that those skilled in the art, upon attaining an understanding of the foregoing, may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

Various aspects and embodiments of the present invention are defined by the following numbered clauses:

The invention claimed is:

1. A wind turbine nacelle configuration for housing a drive train assembly, comprising:
    a frame structure configured for mounting atop a wind turbine tower, said frame structure comprising a base, side support members, and top support members; and
    wherein said frame structure is configured so that at least a portion of said drive train is suspended from said top support members within said frame structure.

2. The wind turbine nacelle configuration as in claim 1, further comprising a shell attached to said frame structure to enclose said nacelle configuration.

3. The wind turbine nacelle configuration as in claim 2, wherein said base is configured for mounting to the wind turbine tower, said frame structure defining a rear section aft of said base having an open bottom, said top support members and said side support members extending at least partially into said rear section, and wherein said shell comprises a panel hinged to said frame structure so as to enclose said open bottom in a first closed position and to provide access into said rear section in a second open position.

4. The wind turbine nacelle configuration as in claim 1, wherein said drive train comprises a low speed rotor shaft connected to a gearbox, a high speed shaft connected to said gearbox, and a generator connected to said high speed shaft, said configuration comprising at least one of said gearbox or said generator suspended from said top support members within said frame structure.

5. The wind turbine nacelle configuration as in claim 4, wherein both of said gearbox and said generator are suspended from said top support members within said frame structure.

6. The wind turbine nacelle configuration as in claim 4, wherein said generator is disposed forward of said gearbox within said frame structure.

7. The wind turbine nacelle configuration as in claim 4, wherein said generator is also disposed above said low speed rotor shaft.

8. The wind turbine nacelle configuration as in claim 4, wherein said base is configured for mounting to the wind turbine tower, said frame structure defining a rear section aft of said base having an open bottom, said top support members and said side support members extending at least partially into said rear section, said gearbox suspended from said top support members within said rear section above said open bottom.

9. The wind turbine nacelle configuration as in claim 8, wherein said open bottom has dimensions such that said gearbox can be disconnected from said top support members and lowered through said open bottom.

10. The wind turbine nacelle configuration as in claim 3, wherein said shell comprises a plurality of panels attached to said frame structure, at least one of said panels being hinged to said frame structure so as to enclose said open bottom in a first closed position and to provide access into said rear section in a second open position.

11. The wind turbine nacelle configuration as in claim 3, further comprising a lifting mechanism supported by said frame structure and configured for moving components into and out of said nacelle through said open bottom.

12. The wind turbine nacelle configuration as in claim 11, wherein said lifting mechanism comprises a winch movably mounted on a track within said frame structure.

13. The wind turbine nacelle configuration as in claim 4, further comprising at least one bearing supported by said frame structure and configured for rotational support of said low speed rotor shaft.

14. A wind turbine comprising:
    a tower; and
    a nacelle configuration mounted atop said tower, said nacelle configuration comprising:
        a frame structure comprising a base, side support members, and top support members;
        a shell attached to said frame structure to enclose said nacelle configuration;
        a drive train housed within said frame structure, said drive train comprising a low speed rotor shaft connected to a gearbox, a high speed shaft connected to said gearbox, and a generator connected to said high speed shaft; and
        at least one of said generator and said gearbox being suspended from said top support members within said frame structure.

15. The wind turbine as in claim 14, wherein both of said generator and said gearbox are suspended from said top support members within said frame structure.

16. The wind turbine as in claim 14, wherein said generator is disposed forward of said gearbox within said frame structure and above said low speed rotor shaft.

17. The wind turbine as in claim 14, further comprising at least one bearing supported by said frame structure configured for rotational support of said low speed rotor shaft.

18. The wind turbine as in claim 14, wherein said base is configured for mounting to said tower, said frame structure defining a rear section aft of said base having an open bottom, said top support members and said side support members extending into said rear section, said gearbox suspended from said top support members within said rear section, and wherein said open bottom has dimensions such that said gearbox can be disconnected from said top support members and lowered through said open bottom.

19. The wind turbine as in claim 18, wherein said shell comprises a panel hinged to said frame structure so as to enclose said open bottom in a first closed position and to provide access to said rear section through said open bottom in a second open position.

20. The wind turbine as in claim 18, further comprising a lifting mechanism supported by said frame structure for moving components into and out of said nacelle through said open bottom.

* * * * *